United States Patent [19]

Korppoo et al.

[11] Patent Number: 4,549,626

[45] Date of Patent: Oct. 29, 1985

[54] ARRANGEMENT IN AIR CUSHION VEHICLES

[75] Inventors: Seppo Korppoo, Espoo; Henry Hänel, Helsinki, both of Finland

[73] Assignee: Oy Wärtsilä Ab, Helsinki, Finland

[21] Appl. No.: 525,658

[22] Filed: Aug. 23, 1983

[30] Foreign Application Priority Data

Aug. 26, 1982 [FI] Finland ................................. 822958

[51] Int. Cl.[4] ............................................... B60V 1/16
[52] U.S. Cl. ...................................................... 180/127
[58] Field of Search ........................ 180/127, 128, 116

[56] References Cited

U.S. PATENT DOCUMENTS 3,465,844 9/1969 Page et al. ........................... 180/127
3,504,755 4/1970 Bliss et al. ............................ 181/127
3,599,746 8/1971 Davis ................................... 180/127
3,752,253 8/1973 Hopkins et al. ...................... 180/127

Primary Examiner—Joseph F. Peters, Jr.
Assistant Examiner—Donn McGiehan
Attorney, Agent, or Firm—John Smith-Hill

[57] ABSTRACT

An arrangement for the attachment of a lower portion of a skirt forming an air cushion limiting member in an air cushion vehicle comprises attachment points inside the skirt. These attachment points include an attachment eye or the like, through which a pulling element is drawn. The pulling element has an inner end attached to the lower skirt portion and, following said pulling element, at the opposite side of the attachment eye, an outer end attached to a point where the attachment is operable from the outside of the air cushion vehicle.

17 Claims, 4 Drawing Figures

ARRANGEMENT IN AIR CUSHION VEHICLES

BACKGROUND OF THE INVENTION

The invention relates to an arrangement for the attachment of the lower portion of a skirt forming an air cushion limiting member in an air cushion vehicle. The lower portion of the skirt has to be attached also to several points inside the skirt, hereinafter the inner attachment points. These attachment points are usually at the bottom of the body of the air cushion vehicle or sometimes at its side. Because the inner attachment points are all inside the skirt, they are not easy to reach, in particular when the air cushion vehicle floats on water or is in rough terrain. Nevertheless, it is a frequent problem to service or replace parts at the inner attachment points due to the great wear occuring in these parts.

SUMMARY OF THE INVENTION

The main object of the invention is to provide an attachment arrangement which considerably simplifies disconnection of the lower portion of the skirt. According to the invention this object is obtained by having, at each inner attachment point an attachment eye or the like, through which a pulling element is drawn, said pulling element having an inner end attached to said lower skirt portion and, following said pulling element, at the opposite side of said attachment eye or the like, an outer end attached to a point where the attachment is operable from the outside of said air cushion vehicle. An attachment arrangement of this kind makes it easy to replace or repair parts of the lower portion of the skirt also under difficult outer conditions.

According to the invention, the load acting at the inner attachment point is by means of a pulling element, such as a cable, a chain or the like, transmitted to another point more easily at hand. However, the pulling element may break or get loose from its attachment. In order to make sure that, also in such a case, no disconnection of the the skirt occurs at the inner attachment point, the attachment is secured by means of a catch member, which prevents said pulling element from sliding through the attachment eye of the inner attachment point. Such a catch member may be of very simple construction, for instance, a elongated member, which is attached between two pulling elements so that due to the tension provided by the pulling elements it takes a position cross-wise to the pulling elements. When the skirt is to be disconnected from its inner attachment point, the catch member is turned into such position that it may pass through the attachment eye of the inner attachment point. Turning of the catch member into such a position can easily be carried out, if it is provided, at its one end, with an eye or the like, which can be engaged by a pulling tool of any suitable kind. Also other security arrangements at the inner attachment point are feasible, but if the air cushion vehicle is to be used in winter conditions, such mechanisms should be avoided, which easily become inoperable, if fully or partly covered with ice. Particularly heavy ice formation occurs in an air cushion vehicle operating at freezing temperatures in open water. It is important that it always is possible to move the catch member into its disconnecting position manually, that its without using other tools than simple force transmission elements, such as a boat hook or the like.

The lower portion of the skirt of an air cushion vehicle is usually of the so called finger type. Then this portion is composed of a great number of adjacent separate skirt elements bent in U-form so that the closed end of the U faces outwards and the legs of the U are attached to an inner attachment point. A finger skirt has the advantage that if some of the fingers get loose or are destroyed the other fingers will expand so much that the openings left by the destroyed fingers are eliminated. The load and the wear acting on the fingers of an air cushion skirt are very great and it happens frequently that some of the fingers have to be replaced.

When an air cushion vehicle operates, its skirt moves violently. Due to this, the elements at the inner attachment points are subject to heavy wear. In order to avoid functional disturbances due to this wear, it is recommended to attach the skirt at each inner attachment point by means of a short chain passing through an attachment eye or the like and ending at the catch member mentioned above. In this case, the actual attachment is carried out by means of elements capable of withstanding heavy wear. The second pulling element attached to the catch member may be a light pulling element, for instance, a steel cable. This member may also work as a skirt supporting element.

DESCRIPTION OF THE PREFERRED EMBODIMENTS

Figure 4:
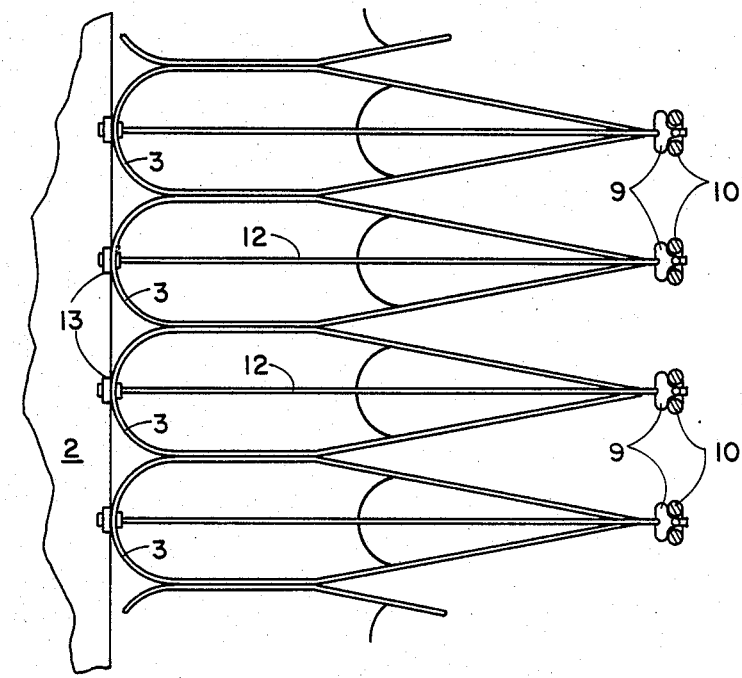
FIG. 4 shows, in simplified form, a sectional view taken on the line IV—IV of FIG. 1.

In the drawing, numeral 1 indicates the body of an air cushion vehicle and numeral 2 the upper portion of the skirt of said vehicle. A great number of skirt fingers 3 are attached side by side to body 1 and to upper portion 2 of the skirt. A few of the skirt fingers 3 are shown in FIG. 4. The fingers are each formed by a piece of skirt rubber material, bent in U-form and so fitted, that the closed end 20 of the U forms a downwards continuation of the upper portion of the skirt, whereas the legs of the U are joined at 4 and attached to the inner attachment point of the finger. Viewed as in FIG. 1, the finger 3 is triangular, one side of the triangle forming the bottom of the U and the opposing apex of the triangle being attached to the inner attachment point.

Figure 1:
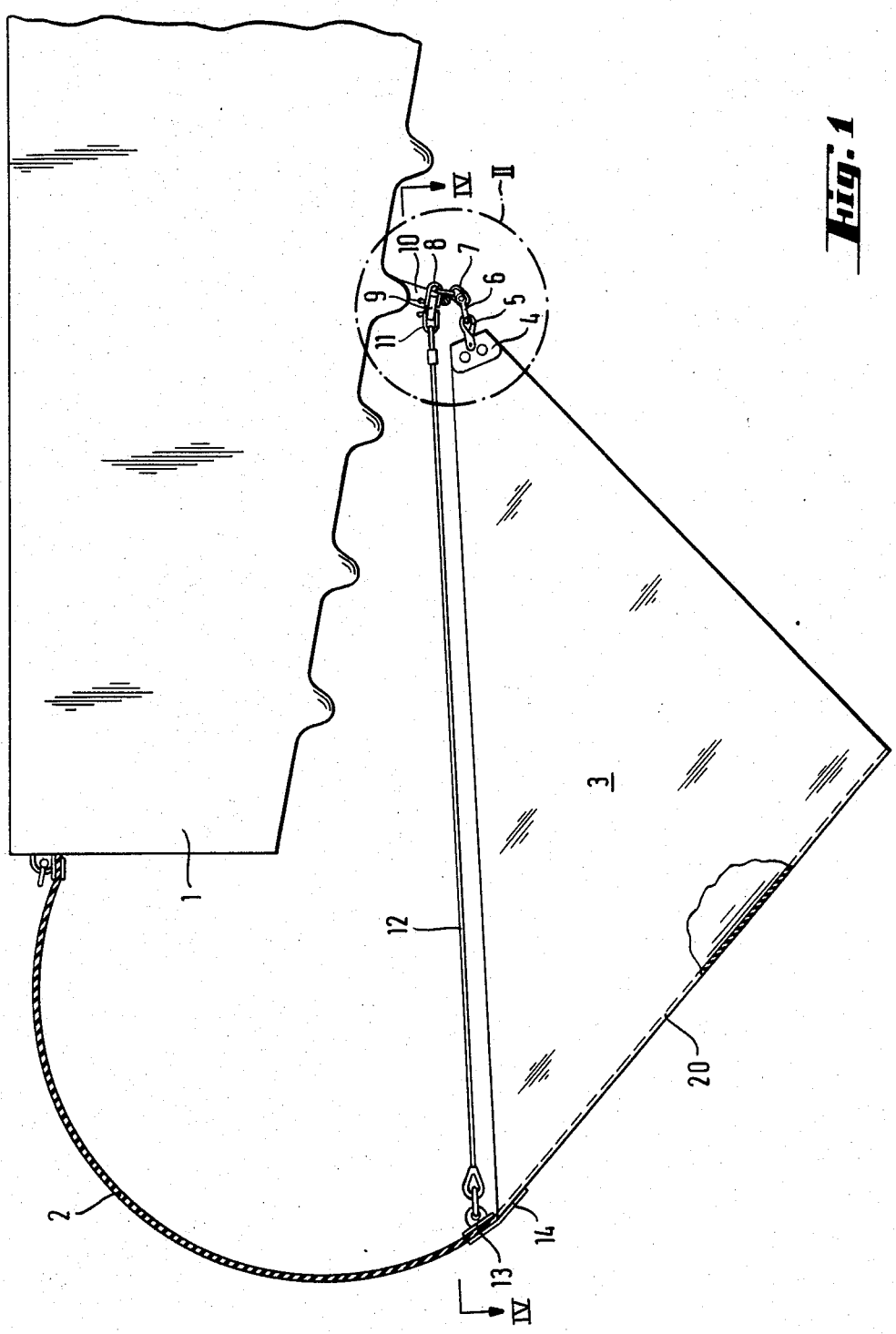
FIG. 1 is a schematic cross-section of the outer portion of the body and the skirt of an air cushion vehicle.
Figure 2:
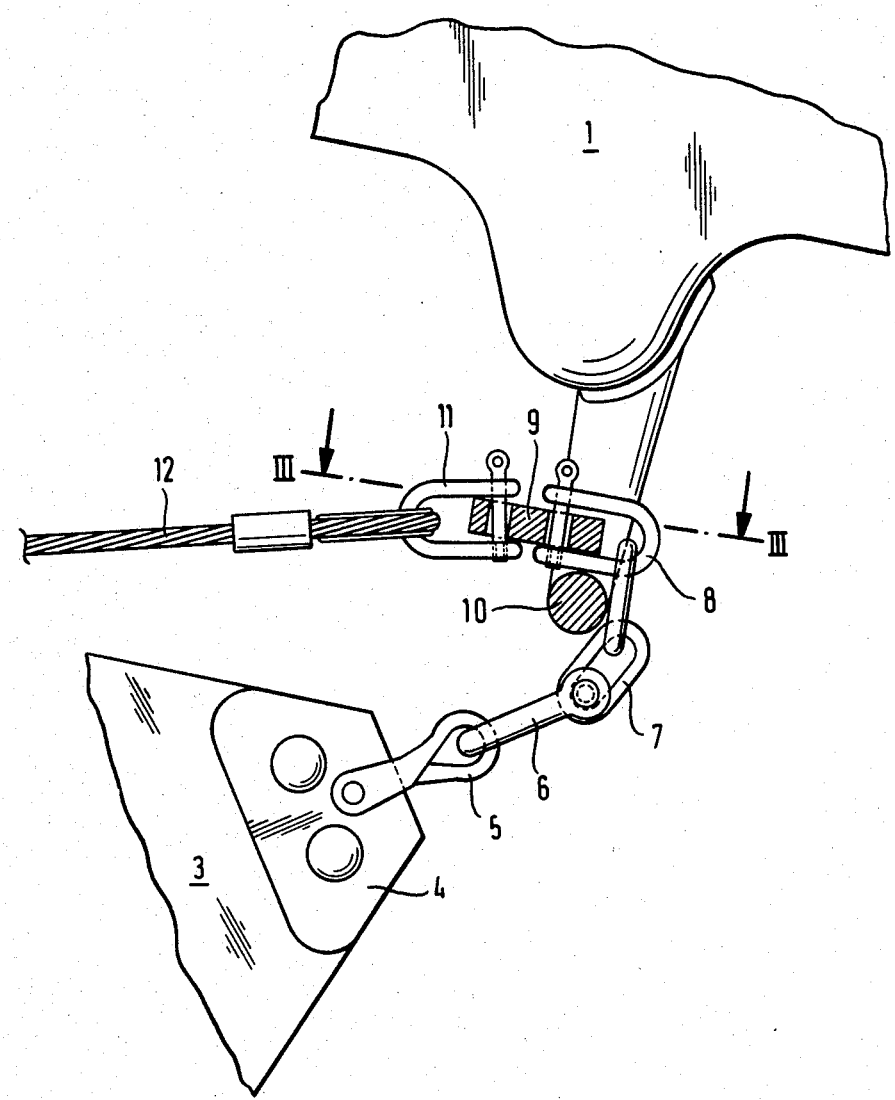
FIG. 2 shows the different elements of the inner attachment point of a skirt finger.

FIG. 2 shows more in detail the elements at the inner attachment point of skirt fingers 3. The fingers have reinforced inner ends 4, which preferably are joined together and connected to a joint metallic attachment element 5, which by means of a shackle 6 is attached to a short chain 7, which in turn by another shackle 8 is attached to a catch member 9. There is an attachment eye 10 rigidly connected to the body of the air cushion vehicle. Catch member 9 rests cross-wise over attachment eye 10 and thereby takes up the load of skirt finger 3. A light pulling element 12, for instance a steel cable, is by means of a shackle 11 attached to the middle portion of catch member 9 opposite the attachment point of chain 7. The opposite end of cable 12 is as shown in FIG. 1, attached to a point 13 close to the outer attachment point 14 of finger 3. The detailed construction of the elements at the inner attachment point is now shown in FIG. 4.

Figure 3:
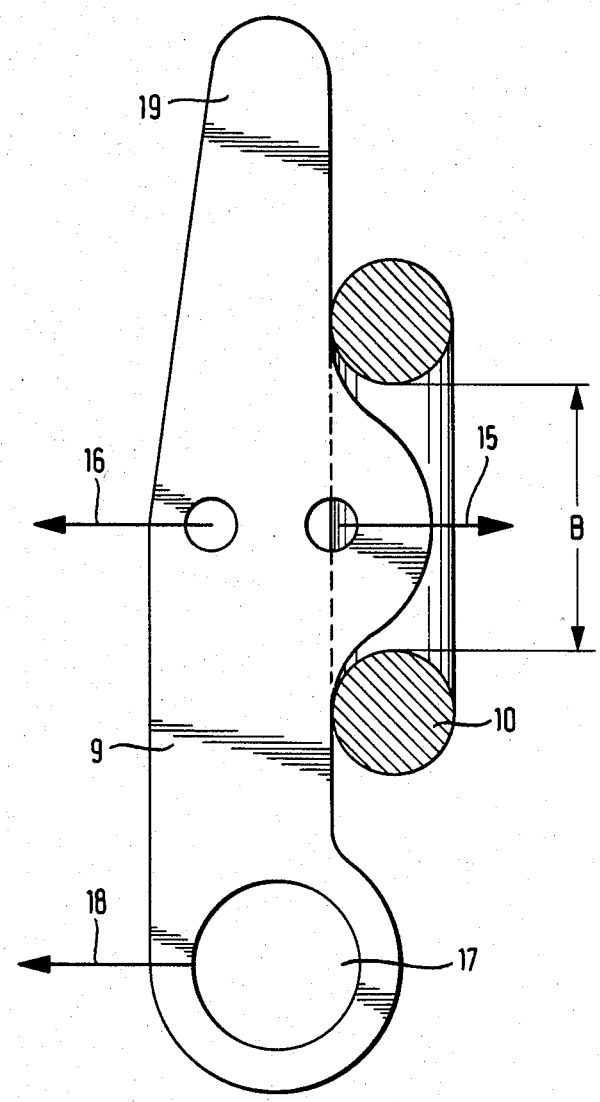
FIG. 3 shows an embodiment of the catch member to be used at the inner attachment point.

A preferred embodiment of catch member 9 is shown in FIG. 3. The load caused by finger 3 is indicated by an arrow 15 and the load exerted by cable 12 by an arrow 16. This pair of forces tend to keep catch member 9 cross-wise relative to attachment eye 10. When disconnection of a finger from its inner attachment point is to be carried out, cable 12 is first pulled in the direction of arrow 16 until catch member 9 is at a some distance from attachment eye 10. The next step is to pull by means of a hook or the like, from the end eye 17 of catch 9 in the direction of arrow 18 until the opposite end 19 of catch member 9 is directed towards attachment eye 10. The free width B of attachment eye 10 should preferably exceed the maximum width of catch member 9. However, if this is not the case, and attachment eye 10 has an elongated form, the plane of catch member 9 can be turned so that it is in the longitudinal direction of attachment eye 10. In this position catch member 9 can slide through attachment eye 10.

When a finger 3 is to be removed it is first disconnected from its outer attachment point 14. Then cable 12 is disconnected from its attachment point 13 and the eye at its outer end is provided with two auxiliary pulling members, ropes or the like of which one is tied to form a closed loop. Attached to these two auxiliary pulling members cable 12 is allowed to pass through attachment eye 10, whereby the entire finger 3 can be pulled out from under the body of the air cushion vehicle. When a new finger is put into place, the cable 12 is attached to the finger as shown in FIG. 2. Now, the loop of the one auxiliary pulling member attached to the outer end of cable 12 is opened and the member is tied in a new loop passing through eye 17 at one end of catch member 9. By pulling simultaneously from both auxiliary pulling members, cable 12 is first pulled through attachment eye 10. By pulling the auxiliary pulling member attached to eye 17 of catch member 9, the catch member is brought into a position allowing it to pass through attachment eye 10. When catch member 9 has passed attachment eye 10, the loop of the auxiliary pulling member attached to its end can be opened and this auxiliary pulling member removed. At the same time the outer end of cable 12 is pulled to its final position and also the other auxiliary pulling member can be removed. The outer end of cable 12 is attached to its attachment point 13 as shown in FIG. 1. The invention is not limited to the embodiments shown, but several variations and modifications thereof are feasible within the scope of the attached claims.

We claim:

1. An arrangement for the attachment of a lower portion of a skirt forming an air cushion limiting member in an air cushion vehicle, said arrangement comprising attachment points inside said skirt, said attachment points having an attachment eye or the like, through which a pulling element is drawn, said pulling element having an inner end attached to said lower skirt portion and, following said pulling element, at the opposite side of said attachment eye or the like, an outer end attached to a point where the attachment is operable from the outside of said air cushion vehicle.

2. An arrangement according to claim 1, wherein said outer end of the pulling element is attached to a middle portion of said skirt at a point where said skirt needs support to keep it at a desired position.

3. An arrangement according to claim 1, wherein the lower portion of said skirt is of finger type comprising a great number of U-bent skirt elements arranged side by side, each of said skirt elements having an outer attachment point at that part of said skirt which is above said finger portion and an inner attachment point at the bottom a body portion of said air cushion vehicle, said fingers being attached to said inner attachment point by means of a pulling element having an inner end attached to the finger, passing through an attachment eye or the like at said inner attachment point, and having an outer end attached to a point where the attachment is operable from the outside of said air cushion vehicle.

4. An arrangement according to claim 3, wherein said outer end of said pulling element is attached to said outer attachment point of said finger or close thereto.

5. An arrangement according to claim 1, wherein there is, at said attachment eye or the like, a catch member preventing said pulling element to slide through said attachment eye due to the load of the skirt portion attached thereto.

6. An arrangement according to claim 5, wherein said catch member is arranged to take up the attachment load at said inner attachment point, whereby that portion of said pulling element, which is between said catch element and said outer attachment point under normal circumstances is not vital for the attachment at said inner attachment point.

7. An arrangement according to claim 5, wherein there is a chain forming a portion of said pulling element passing through said attachment eye, another portion of said pulling element being at the opposite side of said catch member and being a pulling element of lighter construction.

8. An air cushion vehicle comprising a body and a skirt for limiting the vehicle's air cushion, said skirt having at least a lower portion, and the vehicle also comprising means for attaching the lower skirt portion, said means including an attachment eye or the like on the vehicle body inside the skirt, an attachment point at the exterior of the vehicle, and an elongate pulling element which has two opposite ends and which extends through said attachment eye, one of the ends of the pulling element being attached to said lower skirt portion at one side of the eye, for providing a substantially stationary support for resisting the pressure of the air cushion on said lower skirt portion, and the other end of the pulling element, at the other side of said eye, being releasably attached to the vehicle at said attachment point.

9. An air cushion vehicle according to claim 8, wherein the one end of pulling element is attached to the lower skirt portion at a point where the lower skirt portion needs support to keep it at a desired position.

10. An air cushion vehicle according to claim 8, wherein the elongate pulling element is provided at said other side of the eye with a catch member which prevents the pulling element from sliding through the eye due to the load of the lower skirt portion attached to the pulling element at the one end thereof.

11. An air cushion vehicle according to claim 10, wherein the catch member is positioned close to said one end of the pulling member, to take up the load applied to the attachment eye, whereby that portion of the pulling element that is between the catch member and said other end of the pulling element is not required in order to keep the lower skirt portion attached to the attachment eye.

12. An air cushion vehicle according to claim 10, wherein the pulling element comprises two elongate portions which are connected together end-to-end by the catch member, and the catch member is an elongate member which is connected to said portions of the pulling element at positions which are spaced apart in a direction transverse to the length of the catch member, so that when the pulling element is under tension the catch member is urged to a position in which its length direction is transverse to the direction of the tension, and wherein the catch member is formed at one end to be engaged by a tool for turning the catch member so that its length direction is generally aligned with the direction of tension in the pulling element.

13. An air cushion vehicle according to claim 10, wherein the pulling element comprises a first portion extending from said one end to the catch member and through the attachment eye, and a second portion which extends from the catch member to said other end and is of lighter construction then said first portion.

14. An air cushion vehicle according to claim 13, wherein said first portion of the pulling element is a chain.

15. An air cushion vehicle according to claim 8, wherein said skirt has both an upper portion, which is attached to the vehicle body, and a lower portion, and the means for attaching the lower portion comprise means for attaching the lower skirt portion to the upper skirt portion, and wherein said attachment point is located at the upper skirt portion.

16. An air cushion vehicle according to claim 14, wherein the lower skirt portion comprises a plurality of skirt elements bent in U configuration and arranged side by side and attached by the base of the U to the upper skirt portion, a plurality of attachment eyes or the like on the vehicle body inside the skirt, a plurality of attachment points at the exterior of the vehicle, and a plurality of elongate pulling elements associated with the skirt elements respectively and each having two opposite ends and extending through the attachment eyes respectively, one end of each pulling element being attached to the associated skirt element at one side of the eye and the other end of the pulling element, at the other side of the eye, being releasably attached to the vehicle at one of said attachment points.

17. An air cushion vehicle according to claim 16, wherein the attachment points are provided at the upper skirt portion and are associated with the skirt elements respectively, said attachment points being at or close to the position at which the respectively associated skirt elements are attached to the upper skirt portion.

* * * * *